(12) United States Patent
Yamada et al.

(10) Patent No.: US 11,216,090 B2
(45) Date of Patent: Jan. 4, 2022

(54) POSITION INDICATOR AND COORDINATE INPUT DEVICE

(71) Applicant: Wacom Co., Ltd., Saitama (JP)

(72) Inventors: Susumu Yamada, Saitama (JP); Naoko Kawamata, Saitama (JP); Takashi Suzuki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/869,363

(22) Filed: May 7, 2020

(65) Prior Publication Data

US 2020/0371609 A1    Nov. 26, 2020

(30) Foreign Application Priority Data

May 24, 2019    (JP) .............................. JP2019-097288

(51) Int. Cl.
*G06F 3/0354*    (2013.01)
*G06F 3/041*    (2006.01)
*G06F 3/038*    (2013.01)
*G06F 3/044*    (2006.01)
*G06F 3/046*    (2006.01)

(52) U.S. Cl.
CPC ........ *G06F 3/03545* (2013.01); *G06F 3/0383* (2013.01); *G06F 3/044* (2013.01); *G06F 3/046* (2013.01); *G06F 3/04162* (2019.05)

(58) Field of Classification Search
CPC ............. G06F 3/03545; G06F 3/04162; G06F 3/0383; G06F 3/044; G06F 3/046
USPC ....................................................... 345/156
See application file for complete search history.

(56) References Cited

U.S. PATENT DOCUMENTS

| 5,729,251 | A | * | 3/1998 | Nakashima | ......... | G06F 3/03545 |
| | | | | | | 345/156 |
| 2016/0041681 | A1 | * | 2/2016 | Hamaguchi | ........... | G06F 3/0442 |
| | | | | | | 345/174 |
| 2017/0357338 | A1 | * | 12/2017 | Bell | ....................... | G06F 3/0442 |
| 2018/0046272 | A1 | * | 2/2018 | Hara | ................... | G06F 3/04162 |
| 2018/0157341 | A1 | * | 6/2018 | Oda | ......................... | G06F 3/038 |

(Continued)

FOREIGN PATENT DOCUMENTS

| JP | 2013-161307 A | 8/2013 |
| JP | 2016-126503 A | 7/2016 |

(Continued)

*Primary Examiner* — Albert K Wong
(74) *Attorney, Agent, or Firm* — Seed IP Law Group LLP

(57) ABSTRACT

A position indicator includes: a pressure detector that detects a pressure applied to a tip portion as an electrical displacement amount corresponding to a magnitude of the pressure; a pressure output circuit that outputs pressure information indicating a first polarity or a second polarity, the pressure information indicating the first polarity if the electrical displacement amount detected by the pressure detector is greater than or equal to a predetermined value, the pressure information indicating the second polarity if the electrical displacement amount detected by the pressure detector is less than the predetermined value, the predetermined value being larger than a value of the electrical displacement amount detected by the pressure detector when no pressure is applied to the tip portion of the core body; and a transmitting circuit that transmits the pressure information indicating the first polarity or the second polarity output circuit to a position detecting device.

14 Claims, 6 Drawing Sheets

(56) References Cited

U.S. PATENT DOCUMENTS

2019/0146602 A1* 5/2019 Kadowaki ........... G06F 3/03545
                                                    345/174
2020/0225773 A1* 7/2020 Yamamoto ............ G06F 3/0383

FOREIGN PATENT DOCUMENTS

| JP | 2017-216002 A | 12/2017 |
| JP | 2019-16038 A | 1/2019 |

* cited by examiner

POSITION INDICATOR AND COORDINATE INPUT DEVICE

BACKGROUND

Technical Field

The present disclosure relates to a position indicator that is used in conjunction with a position detecting device and has a pressure detecting function, and relates to a coordinate input device including the position indicator and the position detecting device.

Background Art

As a coordinate input device including a position detecting device having a position detecting sensor and a pen type position indicator referred to as an electronic pen, there are various types such, for example, as an electromagnetic coupling type, a capacitive coupling type, or the like, depending on a difference in a coupling system between the position detecting sensor and the position indicator.

The pen type position indicator used for this kind of coordinate input device is generally configured to have a function of detecting a pressure (pen pressure) applied to a tip portion (pen tip) of a core body, and transmitting the pressure to the position detecting device. In this case, in the position indicator, in order to detect the pressure applied to the core body, the tip portion of the core body is protruded from an opening of a casing of the position indicator, and the core body is made movable in the axial direction of the core body with respect to the casing. A pressure detector is provided on an opposite side from the tip portion of the core body. This pressure detector is configured to detect a displacement in the axial direction of the core body, which displacement corresponds to the pressure applied to the tip portion, as an electric change such as a change in capacitance, a change in inductance value, or a change in resistance.

Known as pressure detectors that detect the displacement in the axial direction of the core body as a change in capacitance are a pressure detector having a configuration in which capacitance changes when an area of contact between a dielectric and a conductive elastic member changes according to the applied pressure (see Japanese Patent Laid-Open No. 2016-126503 (hereinafter, referred to as Patent Document 1), for example), a pressure detector formed by a semiconductor device in which a distance between two electrodes opposed to each other with an air layer as a dielectric interposed between the two electrodes changes according to the applied pressure (see Japanese Patent Laid-Open No. 2013-161307 (hereinafter, referred to as Patent Document 2), for example), and the like.

A pressure detector is also known which detects the displacement in the axial direction of the core body according to the applied pressure as a change in inductance value (see Japanese Patent Laid-Open No. 2017-216002 (hereinafter, referred to as Patent Document 3), for example). Further, a pressure detector that detects the displacement in the axial direction of the core body according to the applied pressure as a change in resistance value is known which uses a strain gage (see Japanese Patent Laid-Open No. 2019-016038 (hereinafter, referred to as Patent Document 4), for example).

In the position indicator, a pressure is applied to the tip portion of the core body by bringing the tip portion of the core body into contact with an input surface of the position detecting sensor, and pressing the tip portion of the core body of the position indicator against the input surface. The pressure detector detects the pressure applied to the tip portion of the core body. Then, the position detecting device of the coordinate input device receives information corresponding to the pressure detected by the pressure detector of the position indicator, and outputs the information as information of a value of the pen pressure applied to the tip portion of the core body of the position indicator.

The pressure detector of each of Patent Documents 1 to 4 described above has a structure that detects a reaction force (pressure) occurring when the core body is displaced in the axial direction by pressing the tip portion of the core body of the position indicator against the input surface. Therefore, when the tip portion of the core body of the position indicator merely lightly touches the input surface of the position detecting sensor, almost no pressure is applied to the tip portion, and the capacitance, the inductance, or the resistance value detected by the pressure detector hardly changes. It is thus difficult for these pressure detectors to detect the pressure. In addition, in a state in which a slight pressure is applied to the tip portion of the core body after the tip portion of the core body of the position indicator comes into contact with the input surface, a change in capacitance, inductance, or resistance value which change corresponds to the applied pressure is not stable, and it is difficult to detect the pressure correctly.

Accordingly, in the existing pressure detectors, a load at a time that the detection of the applied pressure becomes possible is not 0 grams, but an offset load of a predetermined magnitude is set. In a case of a load equal to or lower than this offset load, the output pressure value of the pressure detector of the position indicator is output as zero, and then transmitted to the position detecting device.

This will be further described by taking as an example a case of a pressure detector that detects a pressure by using a capacitance, for example. FIG. 9 is a diagram depicting a change characteristic of an applied load detected by the pressure detector versus capacitance. Specifically, as depicted in FIG. 9, a capacitance C of a variable capacitance capacitor formed by the pressure detector is a minimum value Cmin when the applied load is zero, and changes so as to increase gradually as the applied load is increased.

In this case, as described above, the capacitance C of the pressure detector does not change when the applied load is zero, and a stable value is not obtained in the vicinity of the applied load of zero. Accordingly, a predetermined offset load Lg is set, and the capacitance of the pressure detector when the applied load is equal to or lower than the offset load Lg is not used for the calculation of the output pressure value. The offset load Lg is set with a predetermined margin added in consideration of a range in which the capacitance is not stable according to the applied load and also in consideration of variations due to an environmental change such as a temperature change and a secular change. In the past, the offset load Lg has been, for example, approximately 5 grams.

The existing position indicator has a characteristic of the applied load versus the output pressure value as depicted in FIG. 10 as output pressure value information detected by the pressure detector. The output pressure value is set to zero at the offset load Lg or lower.

The offset load Lg is provided in the pressure detector of the existing position indicator in consideration of also the following. When consideration is given to a case where a user performs writing input to an input device such as a tablet device while the user is lying down and directing the tip portion of the core body of the position indicator upward, for example, in a case where the load at which to output the output pressure value is 0 grams without the offset load, a predetermined pressure is detected by the pressure detector due to the own weight of the core body, a pressure transmitting member, and the like of the position indicator though the tip portion of the core body of the position indicator is not in contact with the input surface. In order to avoid this, the existing pressure detector is configured to detect the pressure for the first time when a predetermined load offset of 5 grams or more, for example, is applied after the tip portion of the core body of the position indicator is pressed against the input surface.

Hence, the position indicator including the pressure detector as described above is not configured to detect the pressure applied to the tip portion of the core body of the position indicator at the same time as the tip portion of the core body of the position indicator touches the input surface of the position detecting device. The position detecting device therefore does not treat writing input with the position indicator as valid input until a predetermined load of 5 grams or more, for example, is applied after the tip portion of the core body of the position indicator comes into contact with the input surface.

The position indicator has recently been used as a substitute for writing stationery such as a pencil that forms a trace of writing on paper. However, in a case where the pressure detector does not detect a pressure unless a predetermined offset load is further applied from a state in which the tip portion of the core body of the position indicator is in contact with the input surface of the position detecting sensor, as described above, a predetermined response time is taken before writing input is treated as valid input after the tip portion of the core body of the position indicator comes into contact with the input surface. Therefore, in the case of using the existing position indicator, it is difficult to obtain operating conditions with good usability which operating conditions are similar to those in the case of writing on paper with writing stationery.

In addition, in a state in which the position indicator is not perpendicular but inclined with respect to the input surface of the position detecting device, the pressure detector detects only a small force component in a direction perpendicular to the input surface which force component corresponds to the inclination as the pressure applied to the tip portion of the core body of the position indicator. Hence, when the position indicator is inclined with respect to the input surface of the position detecting device, the pressure that can be detected by the pressure detector of the position indicator is decreased, and therefore a valid output pressure value is not obtained unless a pressure exceeding the offset load Lg as described above or more occurs.

BRIEF SUMMARY

It is an object of the present disclosure to provide a position indicator and a coordinate input device that can solve the above problems.

In order to solve the above problems, there is provided a position indicator including: a pressure detector which, in operation, detects a pressure applied to a tip portion of a core body that protrudes outwardly from an opening of a tubular casing as an electrical displacement amount corresponding to the pressure; a pressure output circuit which, in operation, outputs pressure information indicating a first polarity or a second polarity that is different from the first polarity, the pressure information indicating the first polarity if the electrical displacement amount detected by the pressure detector is greater than or equal to a predetermined value, and the pressure information indicating the second polarity if the electrical displacement amount detected by the pressure detector is less than the predetermined value, the predetermined set value being larger than a value of the electrical displacement amount detected by the pressure detector when no pressure is applied to the tip portion of the core body; and a transmitting circuit which, in operation, transmits the pressure information having the first polarity or the second polarity output from the pressure output circuit to a position detecting device.

The above-described position indicator is configured to be able to output the pressure information indicating the first polarity and the second polarity. The position indicator compares the electric displacement amount corresponding to the pressure detected by the pressure detector with the predetermined set value (offset value) larger than the value of the electric displacement amount detected by the pressure detector when no pressure is applied to the tip portion of the core body. Even when the electric displacement amount detected by the pressure detector is smaller than the set value, the position indicator transmits the pressure information corresponding to the electric displacement amount corresponding to the pressure detected by the pressure detector to the position detecting device together with polarity information.

The position detecting device generates the information of a pen pressure value to be output from the pressure information having the polarity information which pressure information is received from the position indicator, and outputs the information of the pen pressure value. In this case, the position detecting device can perform state estimation as to whether the position indicator is in contact with the input surface of a position detecting sensor and is in a state of being used for writing input, by monitoring the pressure information having the polarity information. It is thus possible to shorten a response time taken from a time point that the tip portion of the core body of the position indicator comes into contact with the input surface to a time point that writing input is treated as valid. Therefore, an environment close to operating conditions with good usability which operating conditions are similar to those in a case of writing on paper with writing stationery can be obtained by using the position indicator having the above-described configuration.

DETAILED DESCRIPTION

A few embodiments of a position indicator and a coordinate input device according to the present disclosure will hereinafter be described with reference to the drawings.

First Embodiment

The coordinate input device according to the present disclosure includes a position indicator and a position detecting device that detects the coordinates of a position indicated by the position indicator. A first embodiment of the coordinate input device according to the present disclosure represents a case where an electromagnetic induction type position indicator is used.

Figure 1:
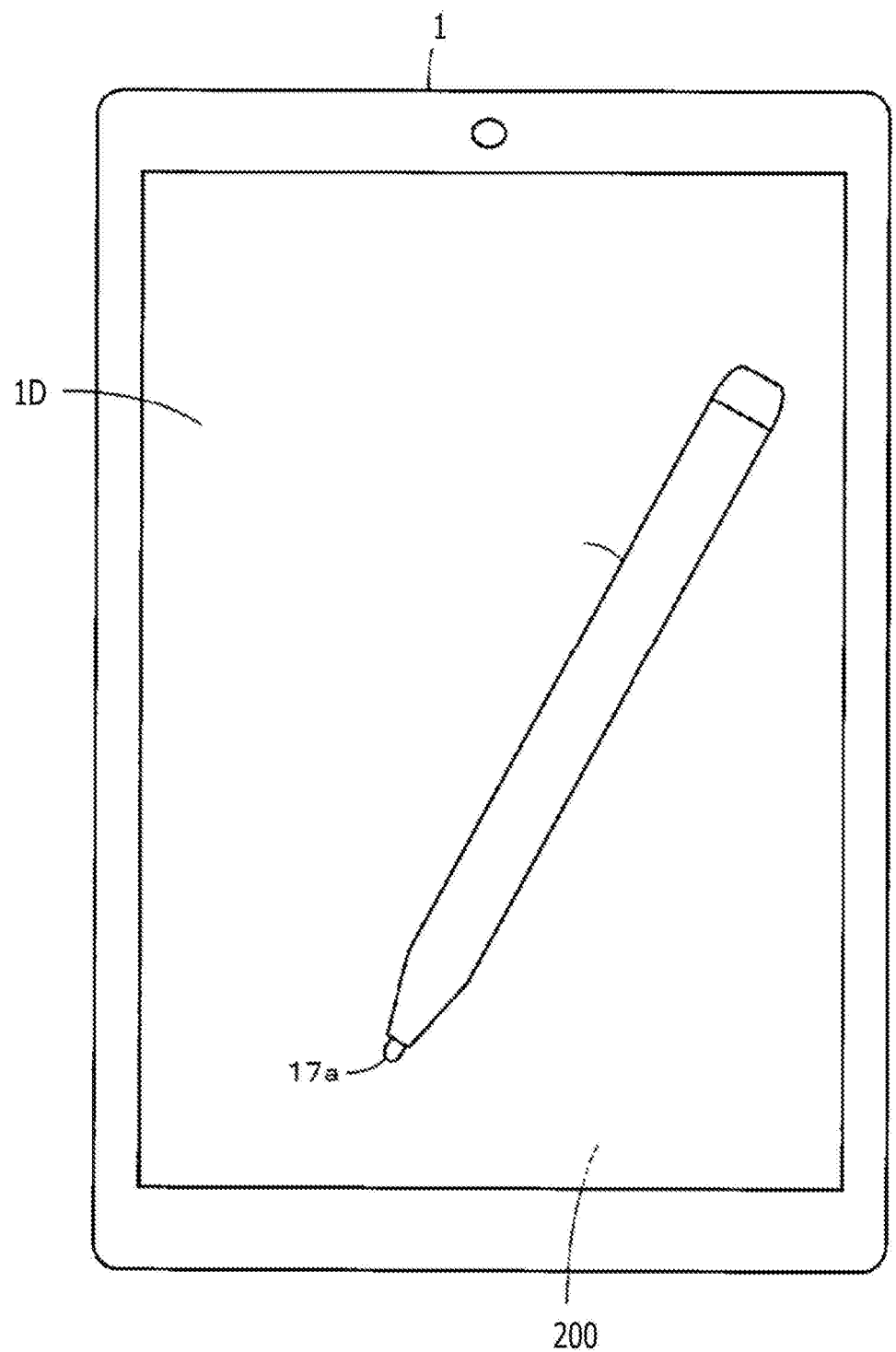
FIG. 1 is a diagram of assistance in explaining an outline of a coordinate input device according to a first embodiment of the present disclosure.

FIG. 1 depicts an example of a tablet type information terminal 1 as an example of the coordinate input device according to the present embodiment. In the present example, the tablet type information terminal 1 includes a display device, or a liquid crystal display (LCD) in the present example, and includes an electromagnetic induction type position detecting device 200 under (on the undersurface side of) a display screen 1D of the display device. In addition, the tablet type information terminal 1 includes an electronic pen 100 as an example of the position indicator that indicates a position by an electromagnetic induction system on a position detecting sensor of the position detecting device 200.

A user brings a tip portion (pen tip) 17a of a core body of the electronic pen 100 into contact with the surface of the display screen 1D, and performs a writing input operation such as drawing a line on the surface of the display screen 1D in a state of applying a predetermined pressure to the tip portion 17a. The position detecting device 200 detects a writing input by the electronic pen 100, and detects the pen pressure of the electronic pen 100 at a time of the writing input.

[Example of Configuration of Electronic Pen 100]

Figure 2:
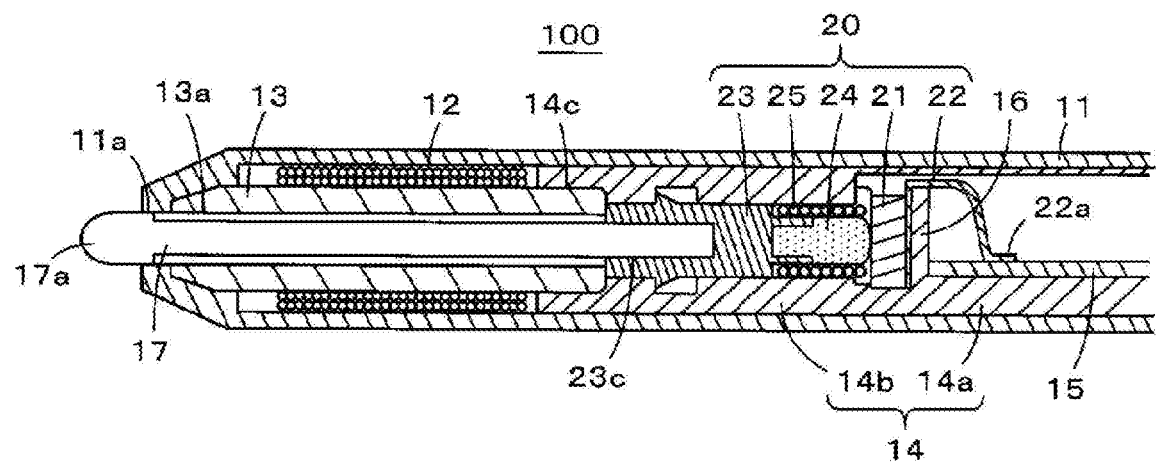
FIG. 2 is a diagram of assistance in explaining an example of a configuration of a position indicator according to a first embodiment of the present disclosure.

FIG. 2 is a fragmentary sectional view of assistance in explaining an example of a configuration of the electronic pen 100 used in the tablet type information terminal 1 as an example of the coordinate input device according to the present first embodiment. As depicted in FIG. 2, the electronic pen 100 according to the present first embodiment has a modularized electronic pen main body portion housed within a hollow portion of a tubular casing 11.

As depicted in FIG. 2, the electronic pen main body portion is formed by coupling, to a holder 14 in an axial direction, a magnetic core, or a ferrite core 13 in the present example, which core is wound with a coil 12. The holder 14 has a configuration in which a board mounting portion 14a mounted with a printed circuit board 15 and a tubular portion 14b housing a pressure detector are coupled to each other so as to be arranged in the axial direction. An end portion of the ferrite core 13 which end portion is on an opposite side from the pen tip side of the ferrite core 13 in the axial direction is fitted to the tubular portion 14b of the holder 14. The ferrite core 13 wound with the coil 12 is thereby coupled to the holder 14.

As depicted in FIG. 2, a pressure detector 20 constituted of a plurality of parts is housed in the tubular portion 14b of the holder 14.

The pressure detector 20 in the present example is similar to that described in Patent Document 1, and represents a case of using a variable capacitance capacitor that changes in capacitance according to a pressure (pen pressure) applied to the pen tip of the electronic pen 100.

The pressure detector 20 in the present example includes a plurality of parts, which are a dielectric 21, a terminal member 22, a retaining member 23, a conductive member 24, and an elastic member 25. These plurality of parts constituting the pressure detector 20 are housed so as to be arranged in the axial direction as depicted in FIG. 2 within a hollow portion of the tubular portion 14b of the holder 14.

The board mounting portion 14a side of the tubular portion 14b of the holder 14 is closed by a wall portion 16. In addition, an opening 14c is formed on the pen tip side in the axial direction of the tubular portion 14b of the holder 14. One end portion in the axial direction of the ferrite core 13 wound with the coil 12 is fitted into the tubular portion 14b in a state in which the plurality of parts constituting the pressure detector 20 are housed within the tubular portion 14b.

A through hole 13a penetrating the ferrite core 13 in the axial direction is provided in a central position of the ferrite core 13. A core body 17 formed by a resin, for example, is inserted through the through hole 13a, and coupled to the pressure detector 20. The tip portion 17a of the core body 17 protrudes outward from an opening 11a of the tubular casing 11.

The dielectric 21 in the present example has a disk shape. The terminal member 22 constitutes a first electrode of a variable capacitance capacitor formed by the pressure detector 20. The terminal member 22 is disposed on one flat surface side of the dielectric 21 in the disk shape. The terminal member 22 has a lead portion 22a. The lead portion 22a straddles the wall portion 16, and is connected by soldering to the printed circuit board 15 mounted on the board mounting portion 14a.

In addition, the conductive member 24 and the elastic member 25 are arranged on another surface side of the dielectric 21 which side is opposed to the one flat surface side of the dielectric 21. The conductive member 24 and the elastic member 25 are electrically connected to each other to constitute a second electrode of the variable capacitance capacitor.

The conductive member 24 is made of a conductive and elastically deformable elastic member, and is, for example, formed by a silicon conductive rubber or a pressure conductive rubber. The conductive member 24 has a shell shape such that an end portion side thereof opposed to the other flat surface of the dielectric 21 bulges in a dome shape. The conductive member 24 is retained by the retaining member 23.

The elastic member 25 is, for example, formed by a conductive coil spring. The elastic member 25 is disposed between the retaining member 23 and the dielectric 21 in a state of housing the conductive member 24 within a winding space of the coil spring. One end of the coil spring constituting the elastic member 25 is coupled to the conductive member 24, so that the elastic member 25 and the conductive member 24 are electrically connected to each other. In addition, though not depicted, another end of the coil spring straddles the wall portion 16, and is soldered and thereby electrically connected to the printed circuit board 15 mounted on the board mounting portion 14*a* of the holder 14.

The retaining member 23 has a recessed hole 23*c* on a side as a pen tip side in the axial direction of the retaining member 23. An end portion of the core body 17 which end portion is on an opposite side from the tip portion 17*a* of the core body 17 is press-fitted into the recessed hole 23*c*.

In the electronic pen 100 formed as described above, when a pressure is applied to the tip portion 17*a* of the core body 17, the core body 17 displaces the retaining member 23 of the pressure detector 20 in the axial direction. Then, an area of contact between the tip end side of the conductive member 24 of the pressure detector 20 and the dielectric 21 changes according to the pressure. A capacitance between the first electrode and the second electrode of the pressure detector 20 therefore changes according to the applied pressure. The electronic pen 100 detects the pressure (load) applied to the tip portion 17*a* of the core body 17 of the electronic pen 100 from the change in the capacitance of the variable capacitance capacitor formed by the pressure detector 20, and transmits an output pressure value corresponding to the detected pressure (load) to the position detecting device 200.

Figure 3:
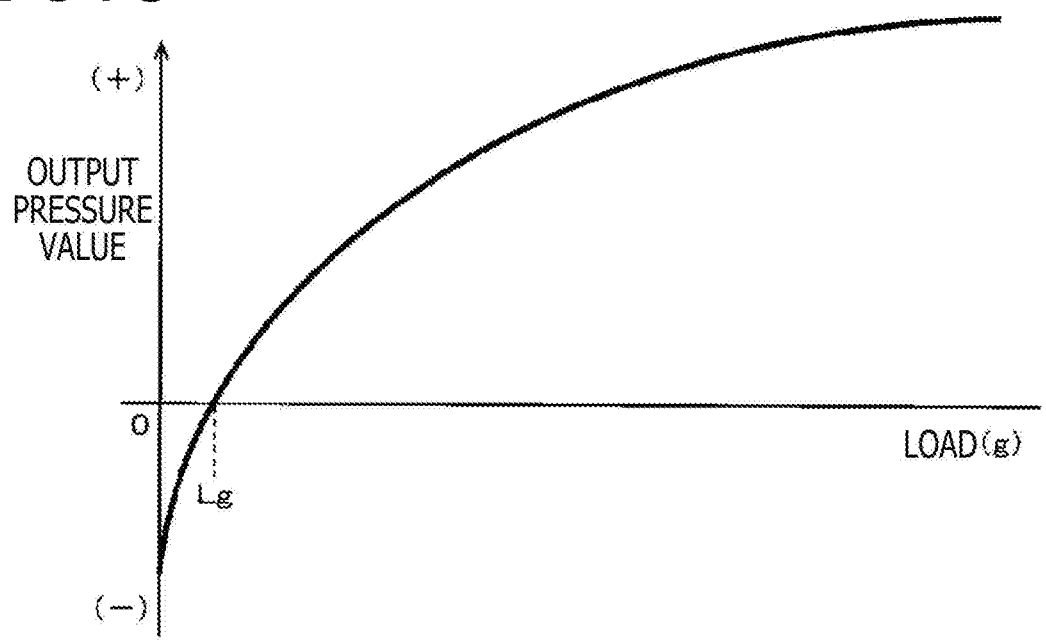
FIG. 3 is a diagram depicting characteristics of information of an output pressure value of the position indicator according to the first embodiment of the present disclosure.

FIG. 3 is a characteristic diagram of the output pressure value versus a load of the electronic pen 100 in the tablet type information terminal 1 as an example of the coordinate input device according to the present embodiment. In the electronic pen 100 according to the present embodiment, as depicted in FIG. 3, an offset load Lg (including a margin) at which the output pressure value is stably obtained is set. In addition, the output pressure value given a negative sign (second polarity) is output when the pressure (load) detected by the pressure detector 20 is lower than the offset load Lg, and the output pressure value given a positive sign (first polarity) is output when the pressure (load) detected by the pressure detector 20 is higher than the offset load Lg.

That is, in the past, when the pressure (load) detected by the pressure detector 20 has been lower than the offset load Lg, zero has always been output as the output pressure value, and the output pressure value corresponding to the load detected by the pressure detector 20 has not been transmitted to the position detecting device. In the present embodiment, on the other hand, even when the pressure (load) detected by the pressure detector 20 is lower than the offset load Lg, the output pressure value corresponding to the pressure (load) detected by the pressure detector 20 is given a negative sign, and transmitted to the position detecting device 200.

In this case, in the present embodiment, the electronic pen 100 transmits the output pressure value as digital information of a plurality of bits to the position detecting device 200. A sign bit as one bit for making a distinction between the positive and negative signs, for example, is added to the output pressure value of the plurality of bits.

In the present embodiment, the position detecting device 200 generates the value of the pen pressure applied to the tip portion 17*a* of the core body 17 of the electronic pen 100 from the information of the output pressure value provided with the positive or negative sign which information is received from the electronic pen 100. The position detecting device 200 then outputs the pen pressure value.

Specifically, the position detecting device 200 according to the present embodiment detects an output pressure value P0 when writing is estimated to be started with the tip portion 17*a* of the core body 17 of the electronic pen 100 brought into contact with the input surface of the position detecting sensor from the information of the output pressure value provided with the positive or negative sign. In detecting the output pressure value P0, the position detecting device, for example, monitors for a change in the output pressure value given the negative sign, and estimates and detects the output pressure value P0 based on a change (polarity reversal) in the sign bit given to the output pressure value when the output pressure value given the negative sign changes so as to increase stably. A method of detecting, as the output pressure value P0, the output pressure value at a time point that the sign bit changes, for example, is used as a concrete method of detecting the output pressure value P0. Alternatively, a predetermined output pressure value generated at a time point after the sign bit changes may be detected as the output pressure value P0. Further, an output pressure value P can also be set based on a change in the sign bit and a characteristic change in the output pressure value.

Then, the position detecting device regards the pen pressure value corresponding to the detected output pressure value P0 as zero, and outputs the pen pressure value corresponding to the output pressure value equal to or higher than the detected output pressure value P0.

Thus, in the coordinate input device according to the present embodiment, the signed output pressure value is transmitted from the electronic pen 100 to the position detecting device 200, and the position detecting device can be configured to output the pen pressure value from the vicinity of the time point at which the tip portion 17*a* of the core body 17 of the electronic pen 100 comes into contact with the input surface of the position detecting device 200. The user can therefore obtain a pen pressure response feeling approximate to a writing feeling with a pencil and paper.

Description will next be made of an example of an electric configuration of the electronic pen 100 and the position detecting device 200 in the tablet type information terminal 1 as an example of the above-described coordinate input device.

Figure 4:
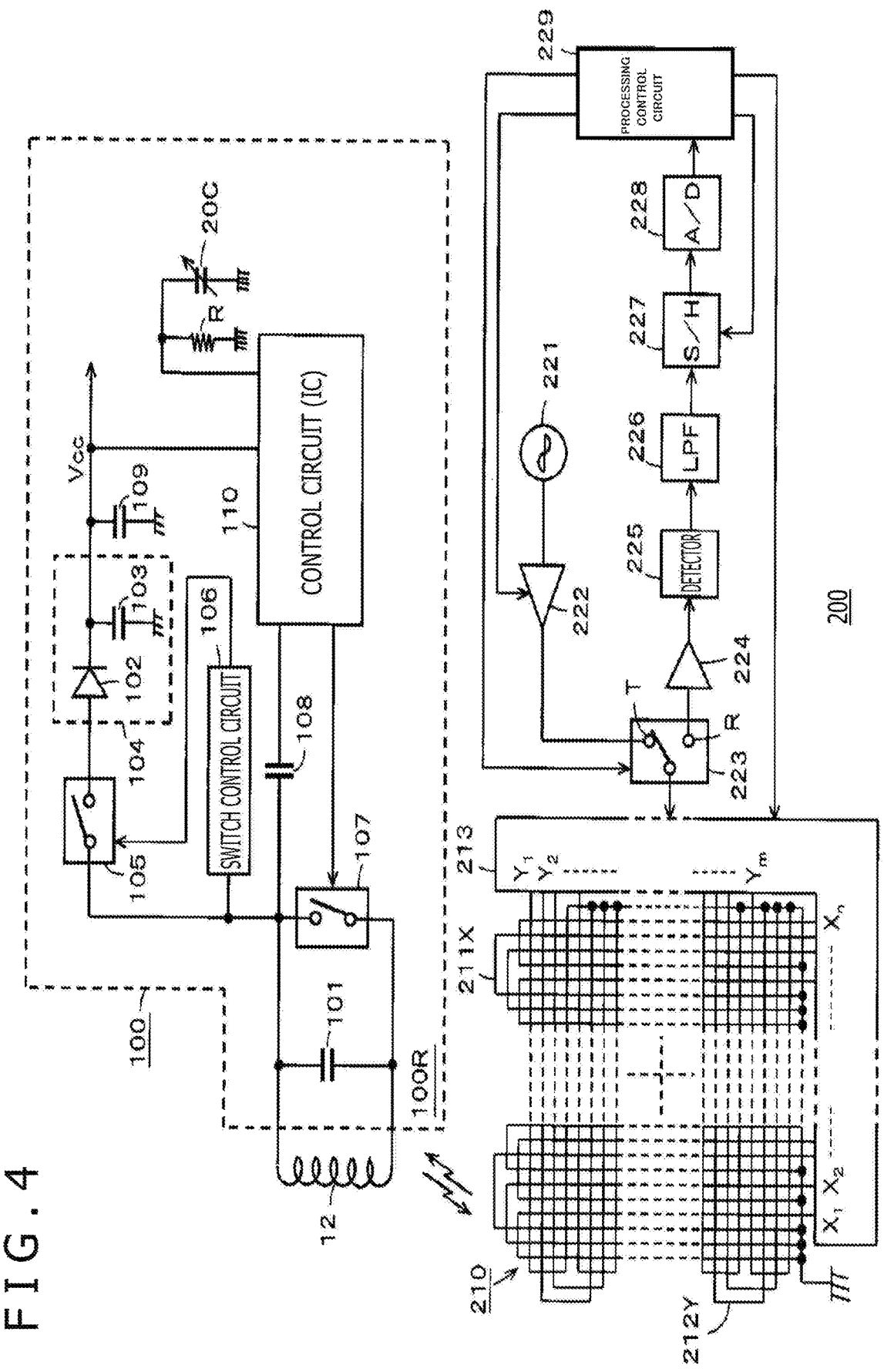
FIG. 4 is a diagram of assistance in explaining an example of an electric configuration of the coordinate input device according to the first embodiment of the present disclosure.

FIG. 4 is a diagram depicting an example of a configuration of an electronic circuit of the electronic pen 100 according to the present embodiment and an example of a configuration of an electronic circuit of the position detecting device 200 that transmits and receives a signal to and from the electronic pen 100 by electromagnetic induction coupling.

The electronic pen 100 in the present embodiment is configured to transmit and receive a signal for position detection by electromagnetic induction coupling to the position detecting sensor 210 of the position detecting device 200, and transmit the information of the output pressure value generated from the capacitance of a variable capacitance capacitor 20C formed by the pressure detector 20 as additional information to the position detecting device 200.

Specifically, as depicted in FIG. 4, in the electronic pen 100, a resonance circuit 100R is formed by connecting a capacitor 101 in parallel with the coil 12 wound around the ferrite core 13.

As depicted in FIG. 4, the electronic pen 100 includes a control circuit 110 that controls the transmission of the additional information. In the present example, the control circuit 110 is formed as an integrated circuit (IC). The IC constituting the control circuit 110 is configured to operate on a power supply voltage Vcc obtained from a capacitor as an example of a storage circuit, for example, an electric double layer capacitor 109. An alternating-current signal received in the resonance circuit 100R from the position detecting device 200 by electromagnetic coupling is rectified in a rectifier circuit 104 constituted of a diode 102 and a capacitor 103. A current rectified by the rectifier circuit 104 charges the electric double layer capacitor 109.

In the present example, a switch circuit 105 set in an open state at normal times (normally open state) is provided between the resonance circuit 100R and the rectifier circuit 104. The switch circuit 105 is formed by a semiconductor switch circuit, for example. The switch circuit 105 has a high impedance in the open state.

The switch circuit 105 is controlled to be on by a switch control signal from a switch control circuit 106. The switch control circuit 106 generates the switch control signal from the alternating-current signal received in the resonance circuit 100R from the position detecting device 200 by electromagnetic coupling.

In addition, in the electronic pen 100, a switch circuit 107 is connected in parallel with the parallel resonance circuit 100R constituted of the coil 12 and the capacitor 101. The switch circuit 107 is configured to be on-off controlled by the control circuit 110. Incidentally, as a synchronizing signal for transmission and reception of an electromagnetic induction signal to and from the position detecting device 200, a signal transmitted from the position detecting device 200 is supplied to the control circuit 110 via a capacitor 108.

In the present embodiment, as depicted in FIG. 4, the variable capacitance capacitor 20C formed by the pressure detector 20 is connected to the control circuit 110. A resistance R is connected in parallel with the variable capacitance capacitor 20C to form a time constant circuit.

The control circuit 110 measures the capacitance of the variable capacitance capacitor 20C, detects the pressure (load) applied to the tip portion 17a of the core body 17 from the measured capacitance of the variable capacitance capacitor 20C, and generates the information of the output pressure value constituted of digital information of a plurality of signed bits from the detected pressure (load).

Figure 5:
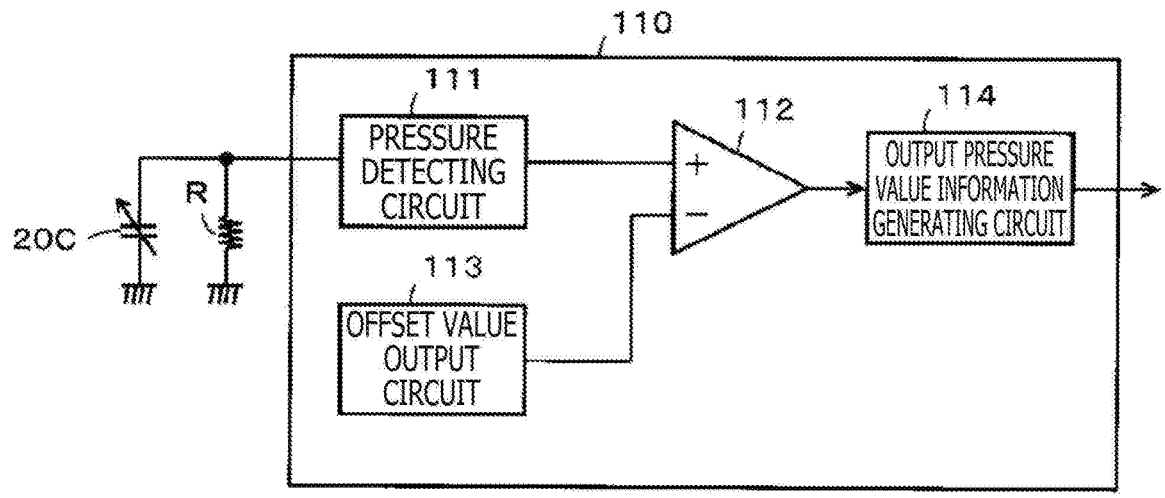
FIG. 5 is a diagram depicting a configuration of an example of parts of the electric configuration example of FIG. 4.

In FIG. 5, a configuration for the detection of the pressure and the generation of the output pressure value in the control circuit 110 is depicted as a functional block diagram. The pressure detecting circuit 111 detects the capacitance of the variable capacitance capacitor 20C as follows. Specifically, in the present example, the pressure detecting circuit 111 charges the variable capacitance capacitor 20C to full charge, thereafter makes the variable capacitance capacitor 20C discharge through the resistance R, and measures a time taken for the voltage of a terminal to which the variable capacitance capacitor 20C is connected (which voltage corresponds to a voltage across the variable capacitance capacitor 20C) to reach a predetermined threshold value. The pressure detecting circuit 111 thereby measures the capacitance of the variable capacitance capacitor 20C.

Then, the pressure detecting circuit 111 detects the pressure (load) applied to the tip portion 17a of the core body 17 from the measured capacitance, and supplies the detected pressure value to a positive side input terminal (non-inverting input terminal) of a differential amplifier 112 constituting a comparing circuit.

The control circuit 110 includes an offset value output circuit 113 that outputs an offset value equal to the detected pressure value when the offset load Lg is detected in the pressure detecting circuit 111. The offset value output circuit 113 can be constituted by a memory (register), for example. The offset value from the offset value output circuit 113 is supplied to a negative side input terminal (inverting input terminal) of the differential amplifier 112.

The differential amplifier 112 performs a difference operation between the detected pressure value supplied to the positive side input terminal and the offset value supplied to the negative side input terminal. When the detected pressure value supplied to the positive side input terminal is equal to or higher than the offset value, a difference output of positive polarity is obtained. In addition, when the detected pressure value supplied to the positive side input terminal is lower than the offset value, a difference output of negative polarity is obtained. The difference output of the differential amplifier 112 is supplied to an output pressure value information generating circuit 114.

When the difference output from the differential amplifier 112 is of positive polarity, the output pressure value information generating circuit 114 converts the difference output into a digital signal of a plurality of bits, and outputs the digital signal after adding a sign bit indicating the positive polarity to the digital signal. In addition, when the difference output from the differential amplifier 112 is of negative polarity, the output pressure value information generating circuit 114 converts the difference output into a digital signal of a plurality of bits, and outputs the digital signal after adding a sign bit indicating the negative polarity to the digital signal.

Then, in the present embodiment, the control circuit 110 transmits the information (digital signal) of the generated output pressure value as, for example, an amplitude shift keying (ASK) modulated signal to the position detecting device 200 by interrupting operation of the resonance circuit 100R. Modulation into an on off keying (OOK) signal may be performed in place of the ASK modulation.

The switch circuit 107 connected in parallel with the resonance circuit 100R is to perform on-off control of the resonance circuit 100R. Specifically, when the switch circuit 107 is off, the resonance circuit 100R is able to perform resonance operation (resonance on). When the switch circuit is on, the resonance circuit 100R does not perform resonance operation (resonance off) because a short circuit occurs across the capacitor 101 in the resonance circuit 100R. The control circuit 110 performs on-off control of the switch circuit 107 according to the digital signal of the output pressure value generated by the output pressure value information generating circuit 114.

In the present embodiment, the control circuit 110 performs on-off control of the switch circuit 107 only when the information of the output pressure value as additional information is transmitted to the position detecting device 200. Otherwise, the control circuit 110 leaves the switch circuit 107 in an off state, and thus holds the resonance circuit 100R in an operating state. When the control circuit 110 receives a synchronizing signal from the position detecting device 200 through the capacitor 108, the control circuit 110 determines that additional information transmission timing has arrived, and performs on-off control of the switch circuit 107 in timing based on the received synchronizing signal.

In the position detecting device 200, as depicted in FIG. 4, a position detecting sensor 210 is formed by stacking an X-axis direction loop coil group 211X and a Y-axis direction loop coil group 212Y. The loop coil groups 211X and 212Y are, for example, constituted of pluralities of n and m rectangle loop coils, respectively. The loop coils constituting the respective loop coil groups 211X and 212Y are disposed so as to be arranged at equal intervals and sequentially overlap each other.

In addition, the position detecting device 200 is provided with a selecting circuit 213 to which the X-axis direction loop coil group 211X and the Y-axis direction loop coil group 212Y are connected. The selecting circuit 213 sequentially selects one loop coil of the two loop coil groups 211X and 212Y.

The position detecting device 200 further includes an oscillator 221, a current driver 222, a switching connecting circuit 223, a receiving amplifier 224, a detector 225, a low-pass filter 226, a sample and hold circuit 227, an analog to digital (A/D) converter circuit 228, and a processing control circuit 229. The processing control circuit 229 is formed by a microcomputer, for example.

The position detecting device 200 transmits an alternating-current signal based on processing control performed by the processing control circuit 229. The switch control circuit 106 of the electronic pen 100 generates a switch control signal that turns on the switch circuit 105 from the alternating-current signal received by the resonance circuit 100R from the position detecting sensor 210 of the position detecting device 200. Thus, when the switch circuit 105 is turned on, the alternating-current signal received by the resonance circuit 100R is rectified by the rectifier circuit 104, and the electric double layer capacitor 109 is charged (stores electricity).

The resonance circuit 100R of the electronic pen 100 in a normal state is in an operating state. Therefore, when the electronic pen 100 approaches the position detecting sensor 210, the resonance circuit 100R of the electronic pen 100 is electromagnetically coupled to the position detecting sensor 210. Then, the resonance circuit 100R of the electronic pen 100 receives the alternating-current signal transmitted from the position detecting device 200, and the electronic pen 100 feeds back a signal in response to the received signal from the resonance circuit 100R to the position detecting sensor 210.

The position detecting device 200 in the present example checks the signal (feedback signal) transmitted from the electronic pen 100, and thereafter transmits a synchronizing signal notifying timing of transmission of the information of the output pressure value from the position detecting sensor 210 to the electronic pen 100.

The control circuit 110 of the electronic pen 100 is driven by the power supply voltage Vcc from the electric double layer capacitor 109, and transmits the information of the output pressure value according to the synchronizing signal received through the capacitor 108.

The oscillator 221 of the position detecting device 200 generates an alternating-current signal of a frequency f0. The resonance frequency of the resonance circuit 100R in the electronic pen 100 is selected such that the frequency f0 is a center frequency. The alternating-current signal generated in the oscillator 221 is supplied to the current driver 222. The current driver 222 converts the alternating-current signal supplied from the oscillator 221 into a current, and sends out the current to the switching connecting circuit 223. The switching connecting circuit 223 selects a connection destination (a transmitting side terminal T or a receiving side terminal R) to which to connect the loop coil selected by the selecting circuit 213, under control of the processing control circuit 229. Of the connection destinations, the transmitting side terminal T is connected with the current driver 222, and the receiving side terminal R is connected with the receiving amplifier 224.

An induced voltage generated in the loop coil selected by the selecting circuit 213 is sent to the receiving amplifier 224 via the selecting circuit 213 and the switching connecting circuit 223. The receiving amplifier 224 amplifies the induced voltage supplied from the loop coil, and sends out the amplified induced voltage to the detector 225.

The detector 225 detects the induced voltage generated in the loop coil, that is, a received signal, and sends out the received signal to the low-pass filter 226. The low-pass filter 226 has a cutoff frequency sufficiently lower than the above-mentioned frequency f0. The low-pass filter 226 converts the output signal of the detector 225 into a direct-current signal, and sends out the direct-current signal to the sample and hold circuit 227. The sample and hold circuit 227 holds a voltage value of the output signal of the low-pass filter 226 in predetermined timing, specifically predetermined timing during a reception period, and sends out the voltage value to the A/D converter circuit 228. The A/D converter circuit 228 converts the analog output of the sample and hold circuit 227 into a digital signal, and outputs the digital signal to the processing control circuit 229.

The processing control circuit 229 controls the selection of a loop coil in the selecting circuit 213, the switching of the switching connecting circuit 223, and the timing of the sample and hold circuit 227. The processing control circuit 229 makes an electromagnetic induction signal transmitted from the X-axis direction loop coil group 211X and the Y-axis direction loop coil group 212Y for a certain transmission duration based on the input signal from the A/D converter circuit 228.

An electromagnetic induction signal transmitted from the electronic pen 100 generates an induced voltage in each of the loop coils of the X-axis direction loop coil group 211X and the Y-axis direction loop coil group 212Y. The processing control circuit 229 calculates the coordinate values of an indicated position in an X-axis direction and a Y-axis direction which position is indicated by the electronic pen 100 based on the signal level of the voltage value of the induced voltage generated in each loop coil.

In addition, the processing control circuit 229 supplies the current driver 222 with a signal for controlling interruption of a transmission signal and a signal for controlling the level of the transmission signal, and performs processing of receiving the information of the output pressure value from the electronic pen 100. Specifically, the processing control circuit 229 detects an intermittent signal formed by the ASK signal from the electronic pen 100 as a digital signal of a plurality of bits provided with a positive or negative sign bit, and thereby detects the information of the output pressure value.

As described earlier, the processing control circuit 229 monitors for a change in the information of the output pressure value as the digital signal of the plurality of bits to which a negative sign bit is added. The processing control circuit 229 thereby regards and detects the pen pressure value corresponding to a predetermined output pressure value as zero based on a change in the sign bit given to the output pressure value (polarity reversal) when the output pressure value given the negative sign bit comes into a state of gradually rising so as to correspond to application of a pressure to the tip portion 17a of the core body 17. Then, when the value indicated by the digital signal given the sign bit is larger than an output pressure value corresponding to the pen pressure value of zero, the processing control circuit 229 outputs a positive pen pressure value corresponding to the output pressure value.

Hence, the processing control circuit 229 can detect the pen pressure value from a time when a load lower than the load Lg corresponding to the offset value is applied to the tip portion 17a of the core body 17 of the electronic pen 100, and can make the timing of making writing input valid earlier than in a case of outputting zero as the pen pressure value until the load corresponding to the offset value is reached. Therefore, a pen pressure response time from making the electronic pen 100 come into contact with the input surface of the position detecting sensor 210 to making writing input valid is shortened, and the user can obtain a pen pressure response feeling approximate to a writing feeling with a pencil and paper.

Incidentally, the above description assumes a case where the offset value is set to be a value higher than a pressure (load) at which the position detecting device 200 regards the pen pressure value as zero, and there is a pressure (load) at which the pen pressure value can be regarded as zero on the negative side of the information of the output pressure value. The position detecting device 200 therefore monitors only for a change in the information of the output pressure value on the negative side of the signed digital signal.

However, the position detecting device 200 may detect a change in the output pressure value also on a positive side. In this case, the zero point of the output pen pressure value can be set appropriately even when, for example, the offset value in the control circuit 110 of the electronic circuit of the electronic pen depicted in FIG. 5 described earlier is not appropriate, or the offset value is shifted due to an environmental change or a secular change and the zero point of the output pen pressure value is to be set to a value higher than the offset value.

Figure 10:
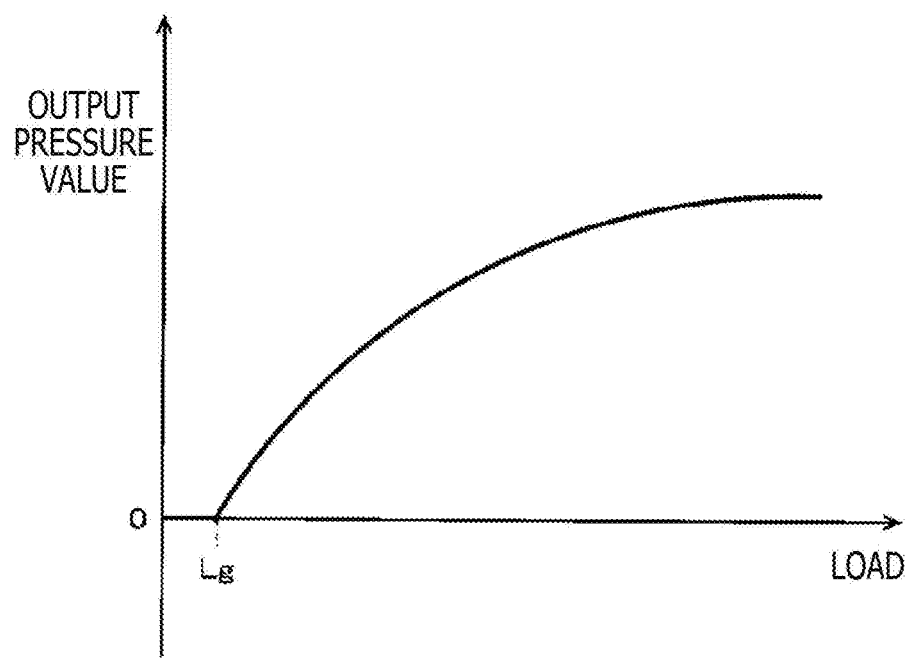
FIG. 10 is a diagram depicting characteristics of information of an output pressure value of an existing position indicator.

For example, the electronic pen 100 can set the offset value appropriately as required by receiving, by the resonance circuit 100R, information for appropriately setting the offset value generated by the position detecting device 200, the information being transmitted from the position detecting sensor 210, and supplying the information to the control circuit 110 via the capacitor 108. In that case, as the information of the output pressure value transmitted from the electronic pen to the position detecting device, a zero value can be output until the offset value is exceeded, and a value corresponding to the detected pressure value can be output when the offset value is exceeded, as depicted in FIG. 10, rather than the information given a positive or negative sign.

In addition, there is an effect in that the position detecting device 200 can detect the contact of the electronic pen 100 with the input surface of the position detecting sensor 210 with high accuracy by analyzing a change in the information of the output pressure value from the negative side to the positive side of the signed digital signal.

Second Embodiment

A second embodiment of the coordinate input device according to the present disclosure represents a case where the position indicator has a configuration of a capacitive coupling type electronic pen. A capacitive coupling type electronic pen 300 constituting the coordinate input device according to the second embodiment has a configuration as depicted in FIG. 6.

Figure 6:
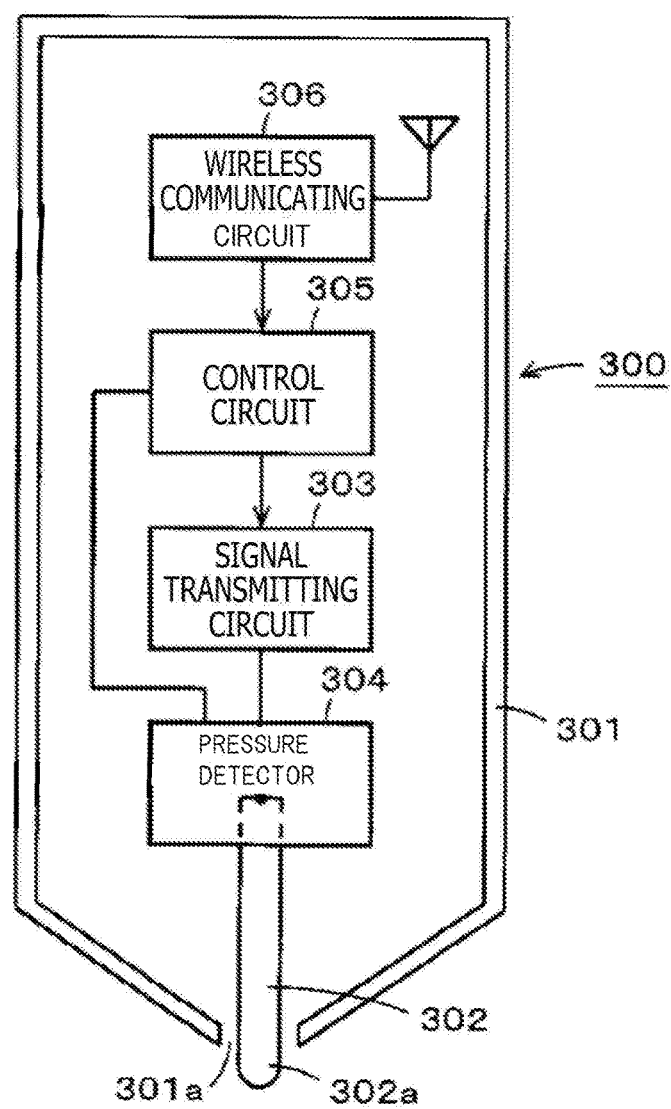
FIG. 6 is a diagram of assistance in explaining an example of a configuration of a position indicator according to a second embodiment of the present disclosure.

As depicted in FIG. 6, the electronic pen 300 has a capacitive coupling type electronic pen main body portion housed within a casing 301. The casing 301 is formed by a nonconductive material, or a resin in the present example. The casing 301 has a tapered shape on a pen tip side, and has an opening 301a for allowing a tip portion 302a of a core body 302 formed of a conductive material, for example, a metal, to project to the outside.

The electronic pen main body portion in the present example includes a signal transmitting circuit 303, a pressure detector 304, a control circuit 305, and a wireless communicating circuit 306. The wireless communicating circuit 306 in the present example is configured to perform short-range wireless communication according to a Bluetooth (registered trademark) standard. The control circuit 305 is formed by an IC.

The signal transmitting circuit 303 supplies an alternating-current signal of a predetermined frequency to the core body 302. The signal supplied to the core body 302 is transmitted to a position detecting sensor 410 (see FIG. 7) by capacitive coupling. The pressure detector 304 has a configuration of a variable capacitance capacitor similar to the pressure detector 20 of the electronic pen 100 according to the foregoing first embodiment. An end portion of the core body 302 which end portion is on an opposite side from the tip portion 302a of the core body 302 is coupled to the pressure detector 304. As with the pressure detector 20 according to the foregoing first embodiment, the pressure detector 304 detects a pressure (load) applied to the tip portion 302a of the core body 302.

In the example of the electronic pen 300 according to the second embodiment, the variable capacitance capacitor formed by the pressure detector 304 is connected to the control circuit 305. As with the control circuit 110 of the electronic pen 100 according to the foregoing first embodiment, the control circuit 305 has a function of generating the information of an output pressure value as a digital signal given a sign bit from the pressure (load) detected by the pressure detector 304 by detecting the capacitance of the variable capacitance capacitor. In the present embodiment, the control circuit 305 is configured to transmit the generated information of the output pressure value to a position detecting device 400 (see FIG. 7) through the wireless communicating circuit 306.

Figure 7:
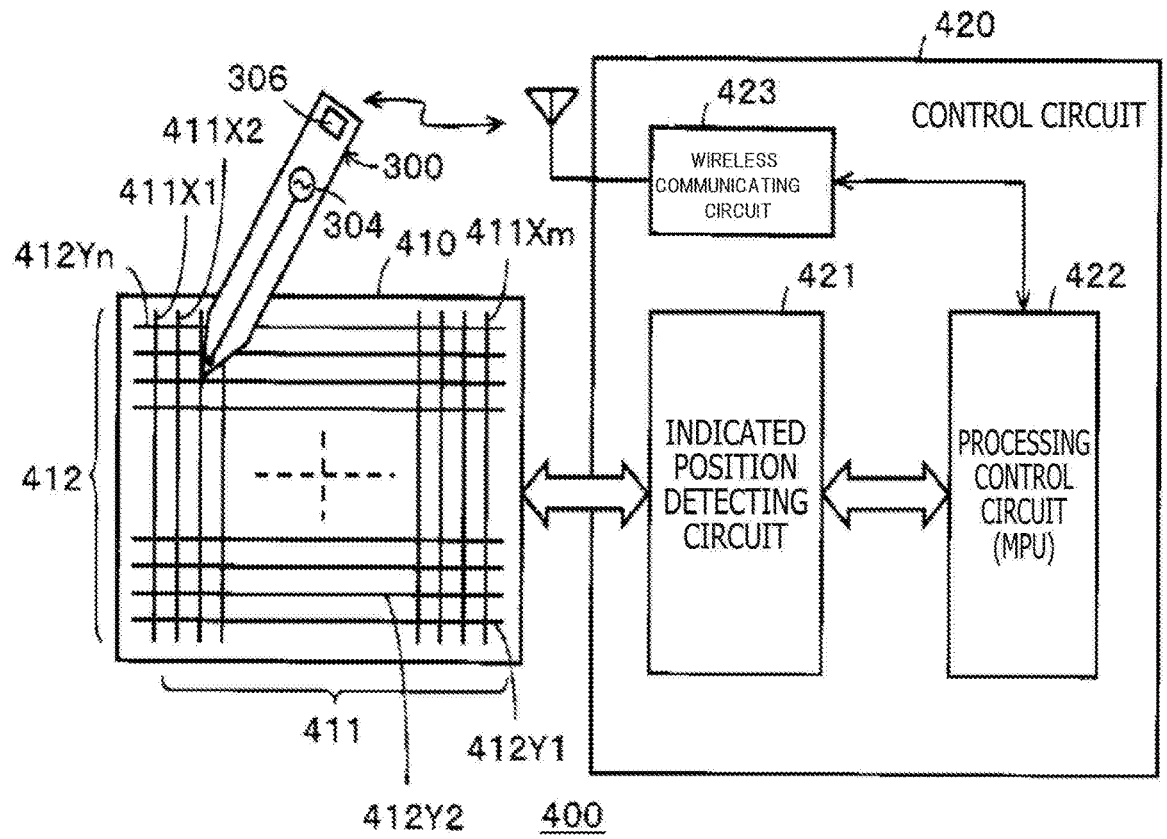
FIG. 7 is a diagram of assistance in explaining an example of an electric configuration of a coordinate input device according to a second embodiment of the present disclosure.

FIG. 7 depicts an example of an electric configuration of a position detecting device 400. FIG. 7 is a block diagram depicting an example of a general configuration of a position detecting sensor 410 and a control circuit 420.

The position detecting sensor 410 in the present example is formed by laminating a Y-conductor group 412, an insulating layer, and an X-conductor group 411 in order from a lower layer side. The position detecting sensor 410 has a grid configuration in which the X-conductor group 411 and the Y-conductor group 412 intersect each other in directions orthogonal to each other. In the Y-conductor group 412, for example, a plurality of Y-conductors 412Y1, 412Y2, . . . , and 412Yn (n is an integer of one or more) extending in a horizontal direction (X-axis direction) are arranged in parallel so as to be separated from each other at predetermined intervals. In addition, in the X-conductor group 411, a plurality of X-conductors 411X1, 411X2, . . . , and 411Xm (m is an integer of one or more) extending in a vertical direction (Y-axis direction) intersecting the Y-conductors 412Y1, 412Y2, . . . , and 412Yn, or orthogonal to the Y-conductors 412Y1, 412Y2, . . . , and 412Yn in the present example, are arranged in parallel so as to be separated from each other at predetermined intervals.

The control circuit 420 includes an indicated position detecting circuit 421, a processing control circuit 422, and a wireless communicating circuit 423. The wireless communicating circuit 423 is to perform wireless communication with the wireless communicating circuit 306 of the electronic pen 300.

The indicated position detecting circuit 421 monitors for reception of a transmission signal from the electronic pen 300 through the position detecting sensor 410, detects a position on the position detecting sensor 410 which position is indicated by the tip portion 302a of the core body 302 of the electronic pen 300 by detecting an X-conductor 411X and a Y-conductor 412Y receiving the transmission signal, and supplies information of the detected position to the processing control circuit 422.

The wireless communicating circuit 423 receives the information of the output pressure value sent from the electronic pen 300, and supplies the information of the output pressure value to the processing control circuit 422. Similarly to the first embodiment, the processing control circuit 422 generates a pen pressure value to be output from the received information of the output pressure value as a digital signal given a positive or negative sign bit.

Hence, also in the second embodiment, similar to the first embodiment, operating conditions can be realized such that writing input can be performed on the input surface in a short time from a time when the electronic pen 300 comes into contact with the input surface of the position detecting device 400.

Incidentally, in the foregoing second embodiment, the information of the pressure detected by the pressure detector 304 of the electronic pen 300 is transmitted to the position detecting device 400 through the wireless communicating circuit 306. However, the information can be transmitted to the position detecting device 400 through the position detecting sensor 410 in a state of being included in the signal from the signal transmitting circuit 303. Specifically, for example, the frequency of the alternating-current signal generated from the signal transmitting circuit 303 may be changed according to the pressure detected by the pressure detector 304, and the position detecting device may detect the pressure by detecting the frequency of the signal received from the electronic pen 300. In addition, the alternating-current signal generated from the signal transmitting circuit 303 may be modulated according to the pressure detected by the pressure detector 304, and then transmitted to the position detecting device 400 through the position detecting sensor 410.

Incidentally, in the first embodiment, the information of the pressure detected by the pressure detector is transmitted to the position detecting device as frequency changes in the resonance frequency. However, also in the first embodiment, wireless communicating circuits may be provided in the electronic pen 100 and the position detecting device 200, and the information of the pressure detected by the pressure detector may be wirelessly transmitted by using the wireless communicating circuits.

[Other Embodiments and Modifications]

In the foregoing first and second embodiments, the pressure detector described in Patent Document 1 is used as the pressure detector provided to the position indicator. However, without limitation to this, any of the pressure detectors described in Patent Documents 2 to 4 may of course be used.

Also, in the electronic pen 300, similar to the case of the electronic pen 100, the offset value can be set appropriately. Specifically, the electronic pen 300 can set the offset value appropriately as required by receiving, by the wireless communicating circuit 306, information for appropriately setting the offset value, the information being transmitted from the wireless communicating circuit 423 of the position detecting device 400, and supplying the information to the control circuit 305. Also, in this case, as the information of the output pressure value transmitted from the electronic pen to the position detecting device, a zero value can be output until the offset value is exceeded, and a value corresponding to the detected pressure value can be output when the offset value is exceeded, as depicted in FIG. 10, rather than the information given a positive or negative sign.

Incidentally, the control circuits 110 and 305 in the electronic pens 100 and 300 are each formed by an IC. However, the control circuits 110 and 305 may be circuits including the configurations of the blocks depicted in FIG. 5 separately.

In addition, in the foregoing embodiments, the position detecting device generates an appropriate offset value from the information of the output pressure value of the digital signal given a positive or negative sign bit, the information being received from the electronic pen, and generates the pen pressure value to be output by using the appropriate offset value. However, the electronic pen itself may generate the appropriate offset value so that the generation of the offset value can be omitted on the position detecting device side.

Figure 8:
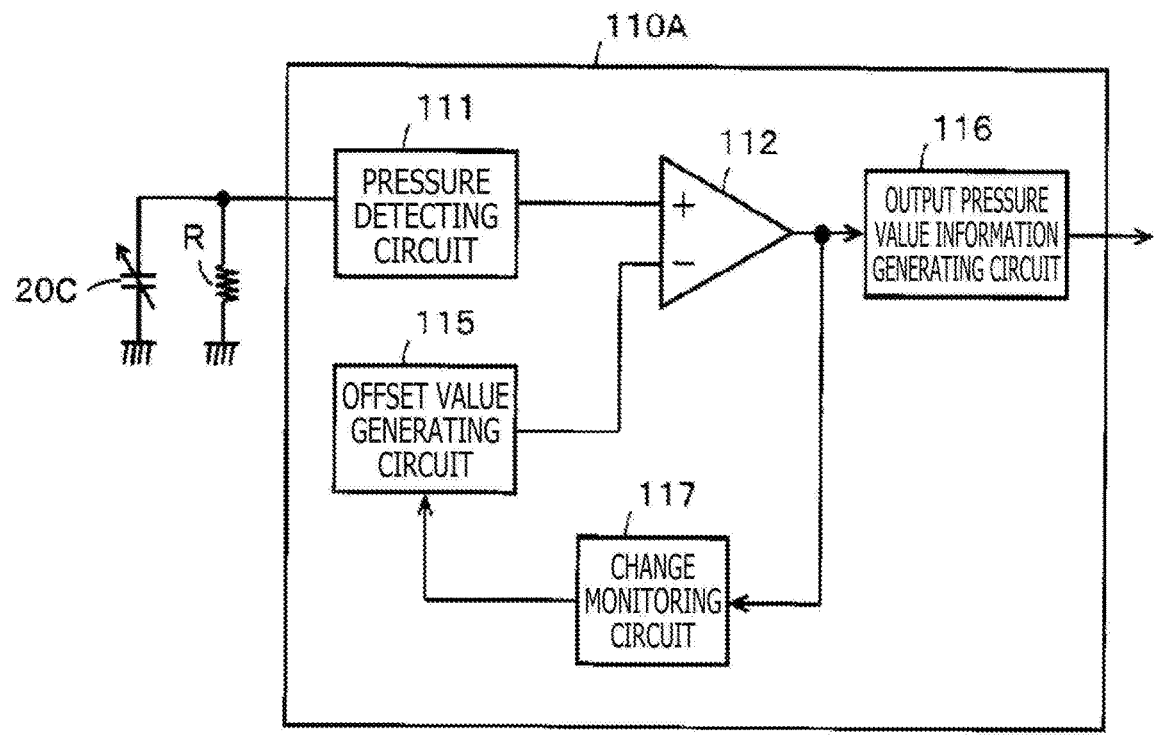
FIG. 8 is a diagram depicting an example of a configuration of parts of a position indicator according to another embodiment of the present disclosure.
Figure 9:
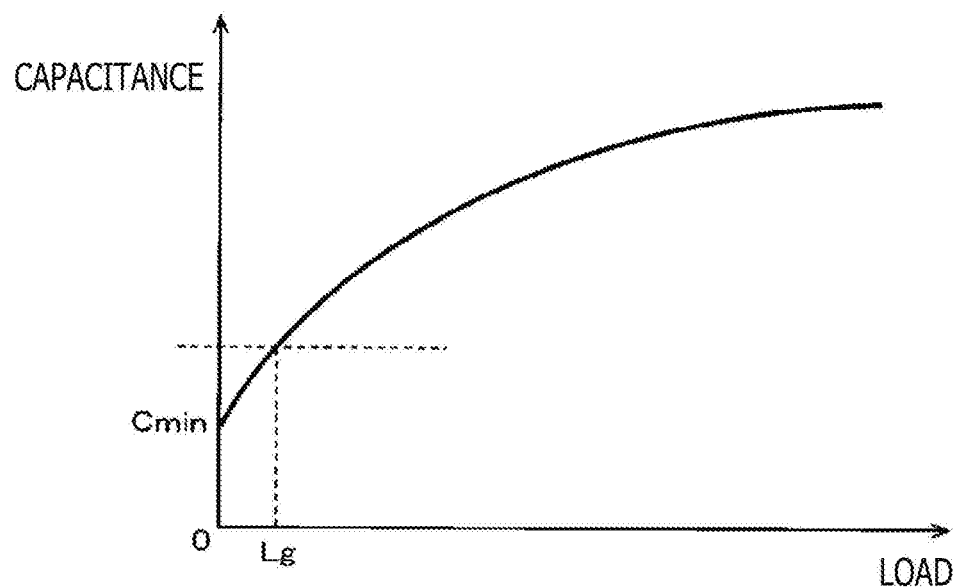
FIG. 9 is a diagram depicting an example of characteristics of a pressure detector.

FIG. 8 depicts an example of a configuration of a control circuit 110A of a thus configured electronic pen. In FIG. 8, constituent parts similar to those of the control circuit 110 depicted in FIG. 5 are identified by the same reference symbols.

In the control circuit 110A in the example of FIG. 8, the negative side input terminal of the differential amplifier 112 is supplied with an offset value from an offset value generating circuit 115. The difference output of positive or negative polarity from the differential amplifier 112 is supplied to an output pressure value information generating circuit 116, and is supplied to a change monitoring circuit 117. The output (offset value control signal) of the change monitoring circuit 117 is supplied to the offset value generating circuit 115. The other circuits are configured in a similar manner to those described with reference to FIG. 5.

With a predetermined offset value determined in advance as a center, for example, the offset value generating circuit 115 is configured to be able to correct the offset value to be output to a value above or below the predetermined offset value according to the output from the change monitoring circuit 117.

The change monitoring circuit 117 monitors a change in the difference output of positive or negative polarity from the differential amplifier 112, and determines whether or not the offset value output from the offset value generating circuit 115 is appropriate. When the change monitoring circuit 117 determines that the offset value output from the offset value generating circuit 115 is not appropriate, the change monitoring circuit 117 supplies the offset value generating circuit 115 with an offset control signal that makes an appropriate offset value output. The offset value generating circuit 115 corrects the offset value to be output according to the offset control signal from the change monitoring circuit 117. Consequently, an appropriate offset value can be output from the offset value generating circuit 115 at all times.

The output pressure value information generating circuit 116 in the present example outputs a zero value when the difference output of the differential amplifier 112 is negative, and outputs a value corresponding to the difference output when the difference output value is positive, as depicted in FIG. 10. Incidentally, also in the present example, the output pressure value information generating circuit 116 may be configured to output an output pressure value of a digital signal given a positive or negative sign bit.

It is to be noted that the embodiments of the present disclosure are not limited to the foregoing embodiments, and that various changes can be made without departing from the spirit of the present disclosure.

What is claimed is:

1. A position indicator comprising:
a pressure detector which, in operation, detects a pressure applied to a tip portion of a core body that protrudes outwardly from a tubular casing;
a pressure output circuit which, in operation, outputs pressure information indicating a positive pressure value or a negative pressure value that is different from the positive pressure value, the pressure output circuit causing the pressure information to indicate the positive pressure value in response to a value of the pressure detected by the pressure detector being greater than or equal to an offset value that is larger than a value of the pressure detected by the pressure detector when no pressure is applied to the tip portion of the core body, and the pressure output circuit causing the pressure information to indicate the negative pressure value in response to a value of the pressure detected by the pressure detector being less than the offset value; and
a transmitting circuit which, in operation, transmits the pressure information indicating the positive pressure value or the negative pressure value output from the pressure output circuit to a position detecting device, the pressure output circuit including:
an offset value generating circuit which, in operation, generates the offset value;
a differential amplifier including a first input terminal and a second input terminal, wherein the first input terminal is coupled to the pressure detector and the second input terminal is coupled to the offset value generating circuit;
an output pressure value information generating circuit coupled to the differential amplifier, wherein the output pressure value information generating circuit, in operation, generates the pressure information based on an output of the differential amplifier; and
a change monitoring circuit coupled to the offset value generating circuit and the differential amplifier,
wherein the change monitoring circuit, in operation, generates an offset control signal based on the output of the differential amplifier, and
wherein the offset value generating circuit, in operation, generates the offset value based on the offset control signal generated by the change monitoring circuit.

2. The position indicator according to claim 1, wherein the pressure detector detects the pressure applied to the tip portion of the core body by detecting a capacitance that changes according to the pressure.

3. The position indicator according to claim 1, wherein the pressure detector detects the pressure applied to the tip portion of the core body by detecting an inductance that changes according to the pressure.

4. The position indicator according to claim 1, wherein the pressure detector detects the pressure applied to the tip portion of the core body by detecting a resistance value that changes according to the pressure.

5. The position indicator according to claim 1, further comprising:
a coupling circuit which, in operation, couples a signal with a position detecting sensor of the position detecting device, the signal enabling the position detecting sensor to detect a position indicated by the position indicator, wherein
the transmitting circuit transmits the pressure information having the positive pressure value or the negative pressure value to the position detecting device through the coupling circuit.

6. The position indicator according to claim 5, wherein the coupling circuit couples the signal by electromagnetic induction coupling.

7. The position indicator according to claim 5, wherein the coupling circuit couples the signal by capacitive coupling.

8. The position indicator according to claim 1, further comprising:
a wireless communicating circuit, which in operation, wirelessly communicates with the position detecting device,
wherein the transmitting circuit transmits the pressure information having the positive pressure value or the negative pressure value to the position detecting device through the wireless communicating circuit.

9. A coordinate input device comprising:
a position indicator; and
a position detecting device,
the position indicator including:
a pressure detector which, in operation, detects a pressure applied to a tip portion of a core body that protrudes outwardly from a tubular casing,
a pressure output circuit which, in operation, outputs pressure information indicating a positive pressure value or a negative pressure value that is different from the positive pressure value, the pressure output circuit causing the pressure information to indicate the positive pressure value in response to a value of the pressure detected by the pressure detector being greater than or equal to an offset value that is larger than a value of the pressure detected by the pressure detector when no pressure is applied to the tip portion of the core body, and the pressure output circuit causing the pressure information to indicate the negative pressure value in response to a value of the pressure detected by the pressure detector being less than the predetermined value, and
a transmitting circuit which, in operation, transmits the pressure information indicating the positive pressure value or the negative pressure value output from the pressure output circuit to the position detecting device,
the pressure output circuit including:
an offset value generating circuit which, in operation, generates the offset value;
a differential amplifier including a first input terminal and a second input terminal, wherein the first input terminal is coupled to the pressure detector and the second input terminal is coupled to the offset value generating circuit;
an output pressure value information generating circuit coupled to the differential amplifier, wherein the output pressure value information generating circuit, in operation, generates the pressure information based on an output of the differential amplifier; and
a change monitoring circuit coupled to the offset value generating circuit and the differential amplifier,
wherein the change monitoring circuit, in operation, generates an offset control signal based on the output of the differential amplifier, and
wherein the offset value generating circuit, in operation, generates the offset value based on the offset control signal generated by the change monitoring circuit, and the position detecting device including:

a receiving circuit which, in operation, receives the pressure information having the positive pressure value or the negative pressure value, the pressure information being transmitted from the position indicator, and a pen pressure value output circuit which, in operation, outputs information indicating a value of the pen pressure applied to the tip portion of the core body of the position indicator based on the pressure information indicating the positive pressure value or the negative pressure value, the pressure information being received by the receiving circuit.

10. The coordinate input device according to claim 9, wherein the pen pressure value output circuit causes the value of the pen pressure to be zero in response to the pressure information indicating a predetermined one of the positive pressure value and the negative pressure value.

11. The coordinate input device according to claim 9, wherein the position indicator and a position detecting sensor of the position detecting device exchange by electromagnetic induction coupling a signal that enables the position detecting sensor of the position detecting device to detect a position indicated by the position indicator.

12. The coordinate input device according to claim 9, wherein the position indicator and a position detecting sensor of the position detecting device exchange by capacitive coupling a signal that enables the position detecting sensor of the position detecting device to detect a position indicated by the position indicator.

13. The coordinate input device according to claim 9, wherein the pressure output circuit, in operation, adds to the pressure information a first bit in response to a value of the pressure detected by the pressure detector being greater than or equal to the offset value, and the pressure output circuit, in operation, adds to the pressure information a second bit in response to a value of the pressure detected by the pressure detector being greater less than the offset value, wherein a value of the first bit is different from a value of the second bit.

14. The position indicator according to claim 1, wherein the pressure output circuit, in operation, adds to the pressure information a first bit in response to a value of the pressure detected by the pressure detector being greater than or equal to the offset value, and the pressure output circuit, in operation, adds to the pressure information a second bit in response to a value of the pressure detected by the pressure detector being greater less than the offset value, wherein a value of the first bit is different from a value of the second bit.

\* \* \* \* \*